F. M. CRISPIN.
AUTOMOBILE TIRE.
APPLICATION FILED AUG. 31, 1909. RENEWED AUG. 29, 1911.
1,009,284. Patented Nov. 21, 1911.
2 SHEETS—SHEET 1.
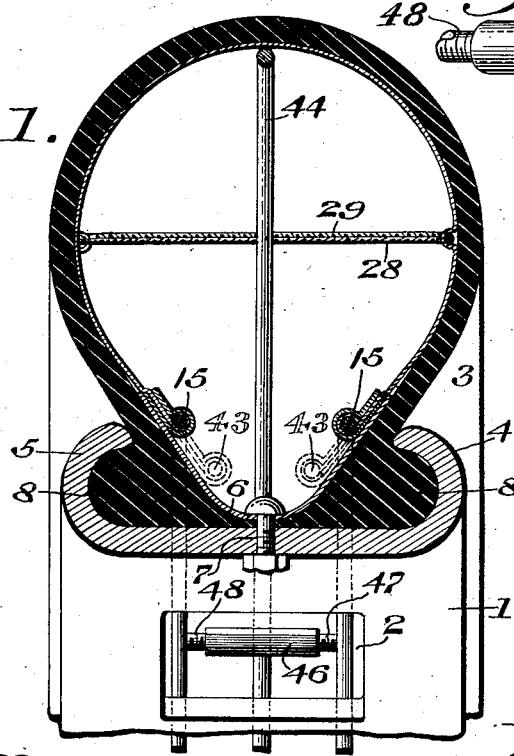
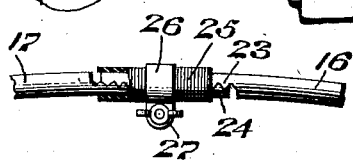
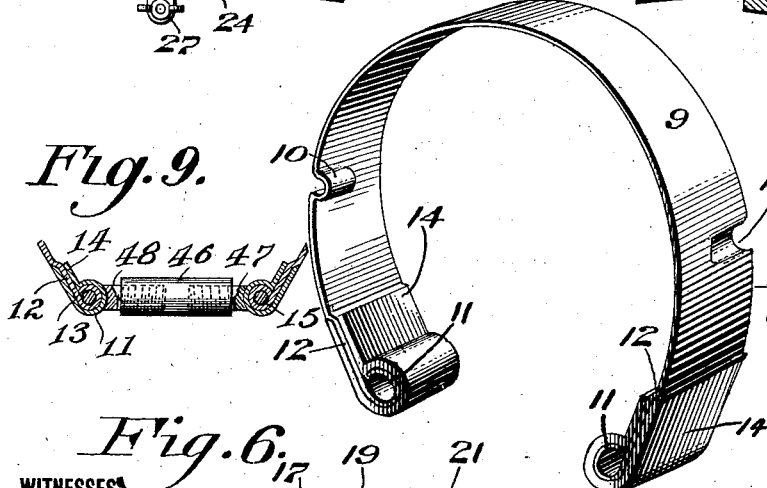

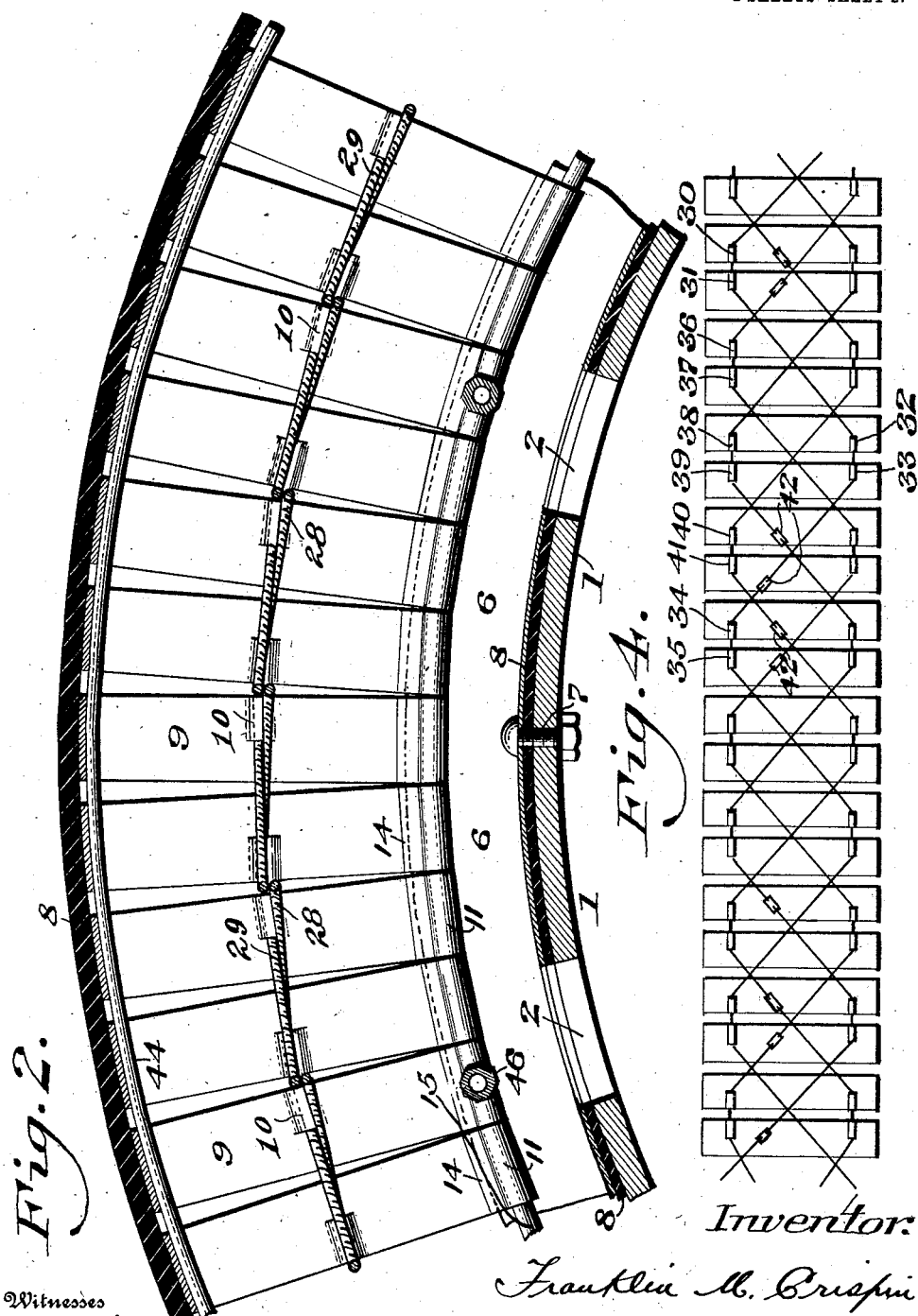

UNITED STATES PATENT OFFICE.

FRANKLIN M. CRISPIN, OF BEVERLY, NEW JERSEY, ASSIGNOR OF ONE-HALF TO JOHN W. HAMER, OF BEVERLY, NEW JERSEY.

AUTOMOBILE-TIRE.

1,009,284.      Specification of Letters Patent.      Patented Nov. 21, 1911.

Application filed August 31, 1909, Serial No. 515,424. Renewed August 29, 1911. Serial No. 646,689.

*To all whom it may concern:*

Be it known that I, FRANKLIN M. CRISPIN, a citizen of the United States, residing at Beverly, in the county of Burlington, State of New Jersey, have invented a new and useful Automobile-Tire, of which the following is a specification.

My invention relates to a spring construction to be used inside the outer casing of an automobile tire to distend the same in place of the inner tube now so used.

The purpose of my invention is to provide means for expanding the springs after they are in place, to limit and adjust the lateral yield of the springs and to support them at the points of greatest need.

A further purpose of my invention is to mount the springs upon circumferentially extending rods, with means to expand the springs, so that the rods and the springs are moved radially and laterally and I accomplish this movement by suitable means accessible through openings in the rim.

A further purpose of my invention is to make the inside of the tire and all mechanism therein accessible from the inner side of the removable rim at all times both for insertion and after adjustment.

It further consists of other novel features of construction, all as will be hereinafter fully set forth.

For the purpose of illustrating my invention, I have shown in the accompanying drawings one form thereof which is at present preferred by me, since the same has been found in practice to give satisfactory and reliable results, although it is to be understood that the various instrumentalities of which my invention consists can be variously arranged and organized and that my invention is not limited to the precise arrangement and organization of these instrumentalities as herein shown and described.

Figure 1 is a cross section of a tire and rim showing one form of my invention. Fig. 2 is a section of the structure shown in Fig. 1 taken upon line *x—x* thereof. Fig. 3 is a perspective of one of the supporting bands shown in Figs. 1 and 2. Fig. 4 is a diagrammatic illustration of the transverse lacing made use of by me. Figs. 5 and 6 are longitudinal sections of joints made use of by me. Fig. 7 is an elevation partly in section of still another form of joint used by me. Fig. 8 represents a perspective view of the turn buckle employed. Fig. 9 represents a partial elevation, partial sectional view showing the members 47 and 48 in engagement with the rings 11 on the bands 9.

Similar numerals of reference indicate corresponding parts in the figures.

Referring to the drawings:—1 designates a removable rim having any suitable number of apertures 2 therein by which the interior of a tire casing mounted thereupon may be accessible, it being understood that the tire casing is similarly apertured to register with the apertures 2. Upon this rim, I mount any recognized form of outer casing 3 retaining it in place exteriorly by means of flanges 4 and 5 of the rim and pressing it against these flanges by means of sections of circular guttering 6 pressed toward the rim by means of bolts and nuts 7 or other suitable means so as to prevent the transverse ribs 8 of the tire from slipping out from beneath the flanges 4 and 5. The sections 6 are preferably arranged to extend between the inner edges of the accessible apertures 2 so as to get the full benefit of these sections without interfering with access to the interior of the tire casing through these apertures. Any suitable number of bolts and nuts 7 may be used.

Within the outer casing 3, I place a plurality of spring bands 9 which are provided with eyes 10 of any suitable form for purposes to be hereinafter discussed and which bands terminate in rings 11 which I have shown as fully closed but which may be made as desired.

The portions 12 of the ends of the bands are moved slightly out of their line of curvature and the rings 11 are embraced by the reinforcing strips 14.

Within the terminals of the rings, I place circumferentially located rods 15 preferably of spring material, mounting the bands 9 upon them as close together as may prove necessary under the circumstances existent, preferably so as to touch each other and not to require spacers between, and I form these rods with sliding joints such as illustrated in Fig. 6, where the ends 16 and 17 of the rods are cut away at 19 and 20 so as to overlap and are incased within the band 21 whose place may be taken by the terminals of the bands 9. With a sufficient number of these sliding jaws in the circumference I may provide for expansion of the rings 15 circumferentially, as hereinafter disclosed, at the same time that they are moved laterally.

Where the bands are not intended to touch each other, or where other provision is made in them for getting at the ends of the rods 15, I may make use of the form of juncture shown in Fig. 7 where I ratchet the ends 16 and 17 at 23 and 24, surround them by a band 25 and hold the band rigidly in place by a strip at 26 by any suitable fastening means 27, it being understood that a great variety of means may be made use of to provide for expansion of these rods with necessity for it.

Between the bands 9 I place ties or lacings indicated by 28 and 29 in Fig. 1 but which are preferably all alike and arranged in series so as to engage two bands upon a side as at 30 and 31, to span two bands, passing diagonally, to engage another two bands on the opposite side as at 32 and 33 and to come back to the same side at which they started to bands at 34 and 35 by spanning two other intermediate bands. Having traced one lacing through a cycle of movement from the side at which it starts until it comes back to a corresponding position I deem it sufficient to state that another tie is correspondingly started at the points 36 and 37 on the two bands adjoining the points 30 and 31, that another tie is correspondingly started at 38 and 39 and that the fourth tie in my illustration is started at 40 and 41.

I recognize that a greater or smaller number of ties may be made use of spanning a greater or smaller number of bands and engaging any desired number thereof the idea being to have a sufficient number of ties to properly support the structure laterally and to provide a sufficient number of adjustments 42 in such ties to permit of considerable expansion or contraction of the same for the purpose of limiting the lateral expansion of the spring bands 9 and permitting the adjustment of this range of limitation for different tube tension or for different conditions of the same tension, to permit greater or less degree of compression of the tire with the obstacle met corresponding to the needs of the service or the desire of the owner. These ties are inserted within the eyes 10 formed upon or in connection with the bands, and the bands are mounted upon the rods tentatively before the structure is inserted within the tire casing. This insertion is then made and the tires with the bands and the interior rods in place but not connected at their ends are mounted upon the demountable rim 8, with or without provision for removability of one of the side flanges thereof, as may be preferred. The rods are then connected at their ends in any suitable manner, as by the form of joints which I have illustrated, placing the rods and bands in some such position as shown in dotted lines 43 in Fig. 1. The outer supporting rods 44 are then put in position to stiffen the circumference of the tire if desired, these rods also being formed in a plurality of sections joined either by joints of the character shown in Fig. 6 or in Fig. 7 or, if desired, being united by a joint 45 such as shown in Fig. 5 if their distention be considered important.

I prefer to have one or more joints of the character shown in Fig. 5 in these supporting rods 44 for the purpose of uniting them. While the ties 28 and 29 are in slacked position, I insert any suitable spreaders, of which I have shown one form in the hexagonal nuts 46 for right and left handed screws 47 and 48, passing them through the apertures 2. I rest the curved ends of the spreaders upon the rods 15 or the terminals 11 according to whether the bands fit close together as indicated in Fig. 2 or are separated somewhat. I prefer to insert one or more spreaders through each space 2 and to operate the transverse nuts as nearly as may be together so that there may not be excessive spreading at one point, with the effect that the bars and ends of the bands are forced apart by the spreaders and guided readily outward radially by the surface of the sections 6, so as to force the bands tightly against the inner surface of the tire casing, extending it to any desired degree. The lacings 28 and 29 are then adjusted to the desired extension by access through apertures 2 so that all of the ties are set for the same extension. The rim and tire are then ready for mounting upon the rim of the wheel where they can be retained by any of the recognized retaining devices.

Having thus described my invention, what I claim as new and desire to secure by Letters Patent, is:—

1. In a device of the character stated, an outer tire casing, a demountable support therefor, the support and tire being apertured at intervals, rods upon opposite sides of the center of said tire, and within it, bands mounted upon said rods, a holding member for said casing having outwardly diverged sides, and means coöperating therewith for forcing said rods radially and outwardly to expand the bands within the tire casing, the actuating portions of said means being accessible through said apertures.

2. In a device of the character stated, an outer tire casing, a demountable support therefor, the support and tire being apertured at intervals, rods upon opposite sides of the center of said tire and within it, substantially circular bands mounted upon said rods, a holding member for said casing having outwardly diverged sides, and means coöperating therewith for forcing said rods radially and outwardly to expand the bands within the tire casing, the actuating portions of said means being accessible through said apertures, and lacings extending transversely between the bands adjacent their transverse diameters to limit their lateral extension.

3. In a device of the character stated, an outer casing, a support therefor, circumferentially extending means for retaining said casing against the support, said means having angularly extended sides, circumferentially disposed rods within said casing, substantially circular spring bands upon said rods, and means constructed to force the rods and bands laterally in engagement with the said angularly extended sides to extend them radially.

4. In a device of the character stated, an outer casing, a support therefor, substantially circular spring bands within said casing, circumferentially disposed means for supporting the bands therein, and a lacing extending from one side of the casing to the other and connecting opposite sides of the bands near their greatest diameter to limit the lateral movement of the bands.

5. In a device of the character stated, an outer casing, a support therefor, substantially circular spring bands within said casing, circumferentially disposed means for supporting the bands therein, a lacing extending from one side of the casing to the other and connecting opposite sides of the bands near their greatest diameter to limit the lateral movement of the bands, and means for adjusting the length of the lacing.

6. In a device of the character stated, an outer casing, a support therefor, a circumferentially disposed plate of wedged section for retaining the casing against the support, substantially circular bands within said casing, and means constructed to press the inner ends of the bands outwardly against the wedge of the plate to distend them against the inside of the casing.

7. In a device of the character stated, an outer casing, a support therefor, wedge shaped means for retaining the casing against the support, substantially circular bands within the casing and means constructed to force the bands laterally against the wedge to cause them to move radially also against the casing.

8. In a device of the character stated, an outer casing, a support therefor, a circumferentially disposed web member for retaining the casing against the support, a plurality of substantially circular bands within the casing, and means connected with the ends of the bands to force them laterally against said member.

9. In a device of the character stated, an outer casing, a support therefor, a circumferentially disposed web member for retaining the casing against the support, a plurality of substantially circular bands within the casing, and means connected with the ends of the bands to force them laterally against said member, the ends of said bands being separated from each other.

10. In a device of the character stated, an outer casing, a support therefor, a circumferentially disposed web member for retaining the casing against the support; a plurality of substantially circular bands within the casing, means connected with the ends of the bands to force them laterally against said member, the ends of said bands being separated from each other, and adjusting means connecting said bands independently of the web member.

FRANKLIN M. CRISPIN.

Witnesses:
 W. I. JACKSON,
 C. D. McVAY.

---

Copies of this patent may be obtained for five cents each, by addressing the "Commissioner of Patents, Washington, D. C."